J. F. TEEHAN.
MEASURING MACHINE.
APPLICATION FILED JUNE 9, 1909.
966,871.
Patented Aug. 9, 1910.
5 SHEETS—SHEET 3.
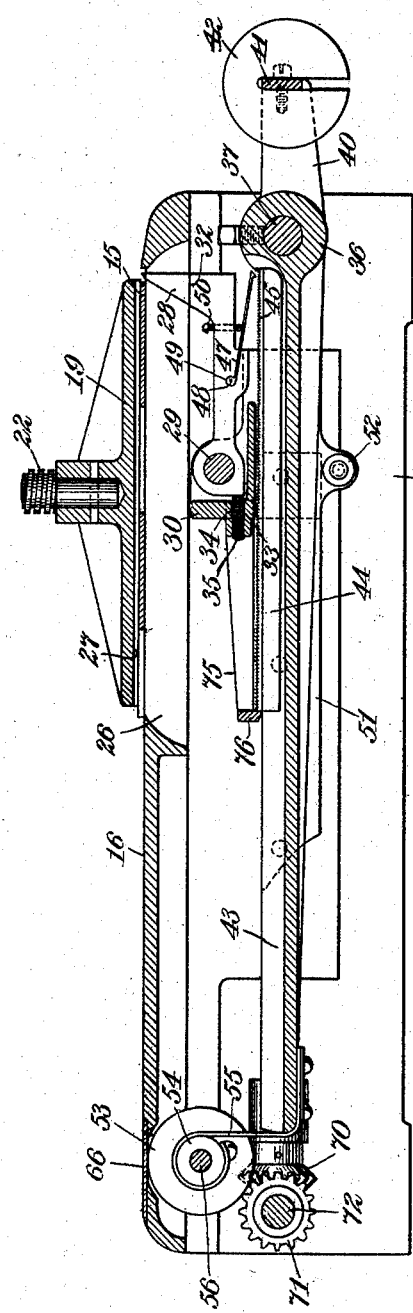
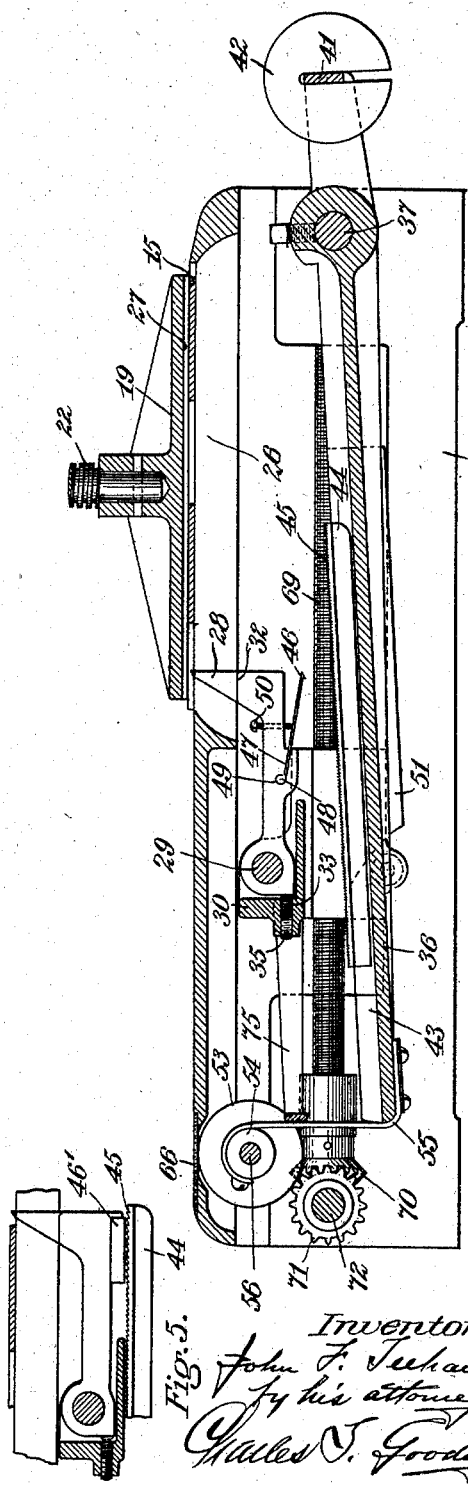
Witnesses:
Sydney E. Taft.
Louis A. Jones.
Inventor:
John F. Teehan
by his attorney
Charles N. Gooding.

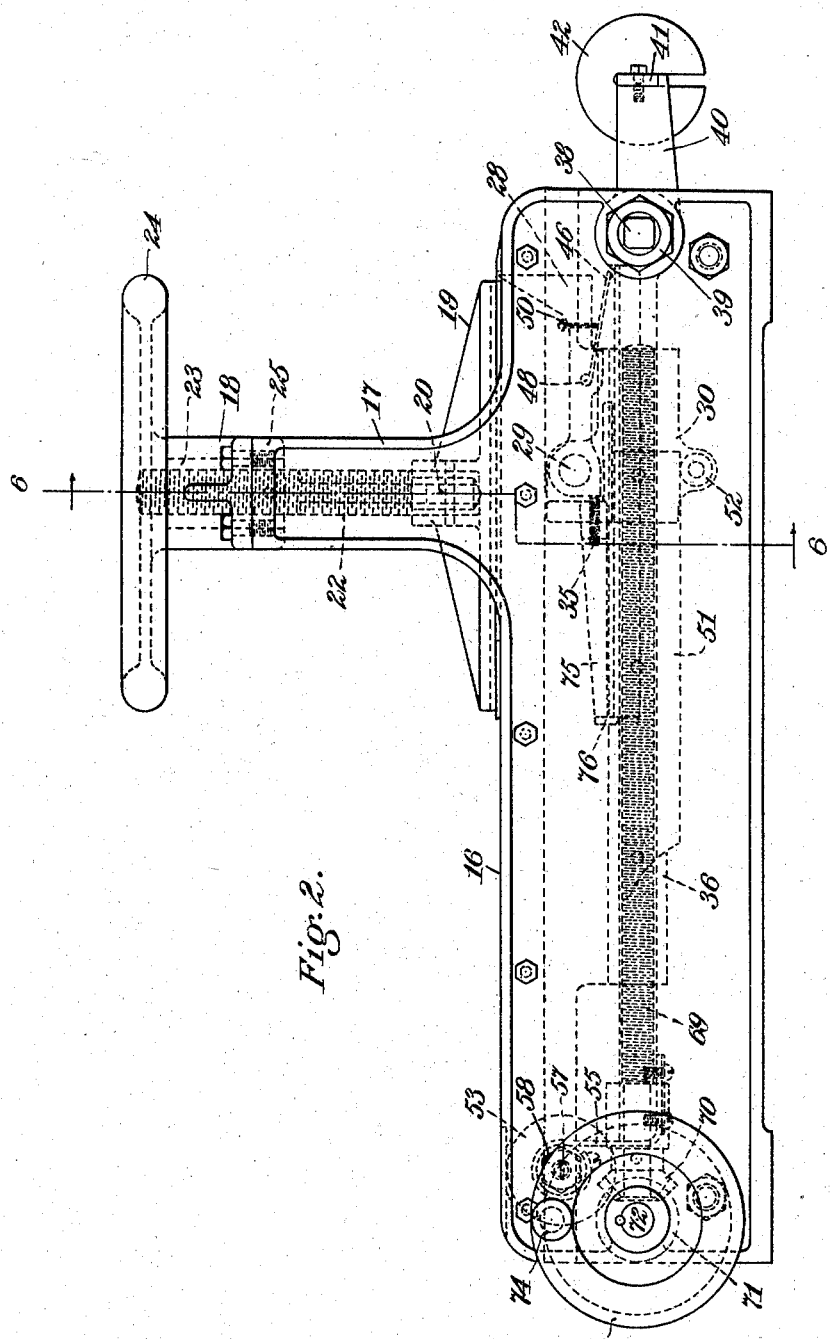

J. F. TEEHAN.
MEASURING MACHINE.
APPLICATION FILED JUNE 9, 1909.

966,871.

Patented Aug. 9, 1910.
5 SHEETS—SHEET 4.

Witnesses:
Sydney E. Taft.
Louis A. Jones.

Inventor:
John F. Teehan,
By his attorney
Charles T. Gooding.

THE NORRIS PETERS CO., WASHINGTON, D. C.

J. F. TEEHAN.
MEASURING MACHINE.
APPLICATION FILED JUNE 9, 1909.

966,871.

Patented Aug. 9, 1910.
5 SHEETS—SHEET 5.

Witnesses:
Sydney E. Taft.
Louis A. Jones.

Inventor:
John F. Teehan
by his attorney
Charles J. Gooding

UNITED STATES PATENT OFFICE.

JOHN F. TEEHAN, OF BROCKTON, MASSACHUSETTS.

MEASURING-MACHINE.

966,871.  Specification of Letters Patent.  Patented Aug. 9, 1910.

Application filed June 9, 1909. Serial No. 501,102.

*To all whom it may concern:*

Be it known that I, JOHN F. TEEHAN, a citizen of the United States, residing at Brockton, in the county of Plymouth and State of Massachusetts, have invented new and useful Improvements in Measuring-Machines, of which the following is a specification.

This invention relates to improvements in measuring machines, and the object is to provide a machine by means of which the areas of plane surfaces of objects may be readily and quickly measured and the area indicated by an indicating device; and the object is further to provide a machine of this class which shall be particularly adapted to measure thin flat objects of irregular outline, such as shoe patterns, leather and the like.

The invention consists in the novel features of construction and in the combination and arrangement of parts set forth in the following specification and particularly pointed out in the appended claims.

Figure 1:
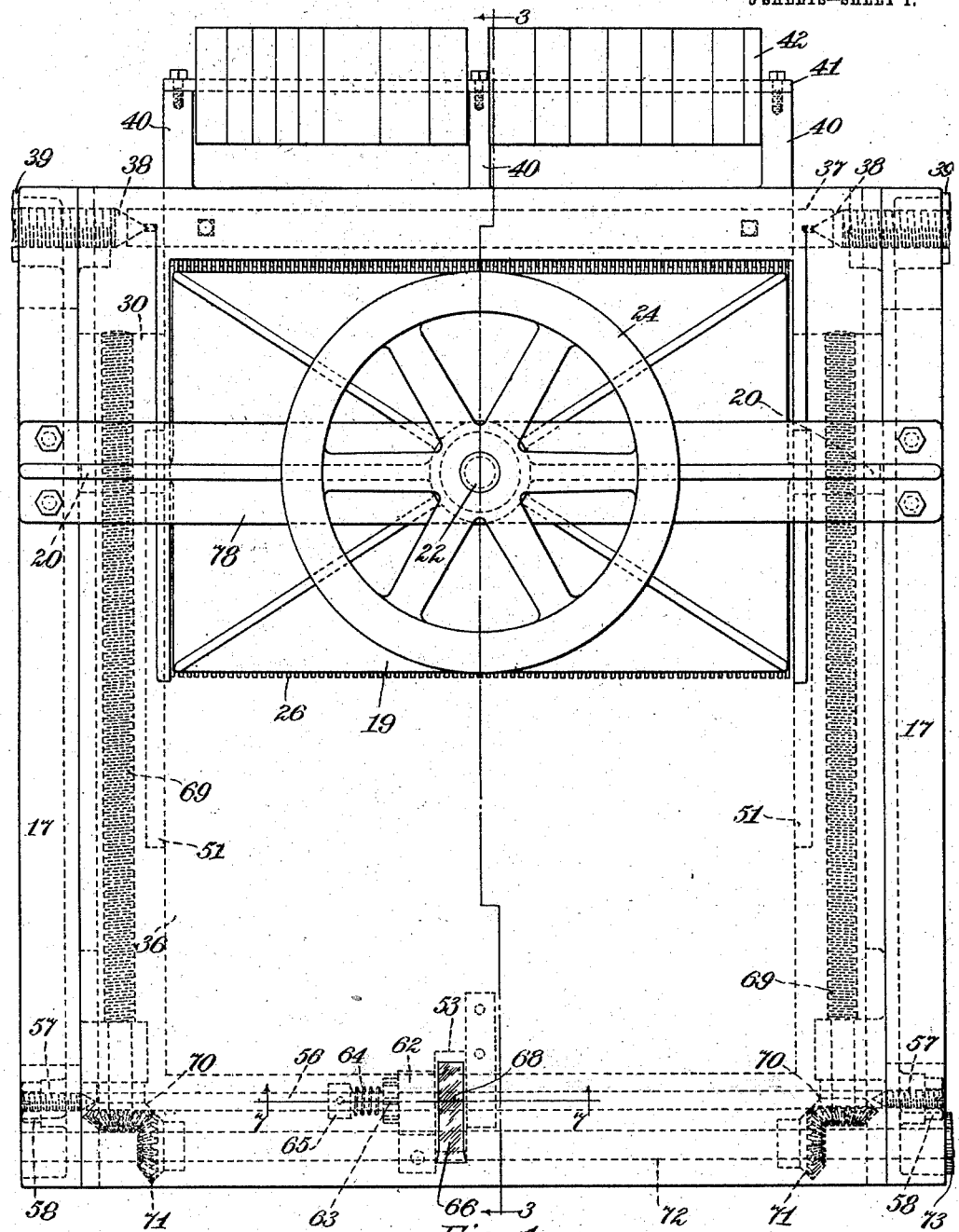
Figure 6:
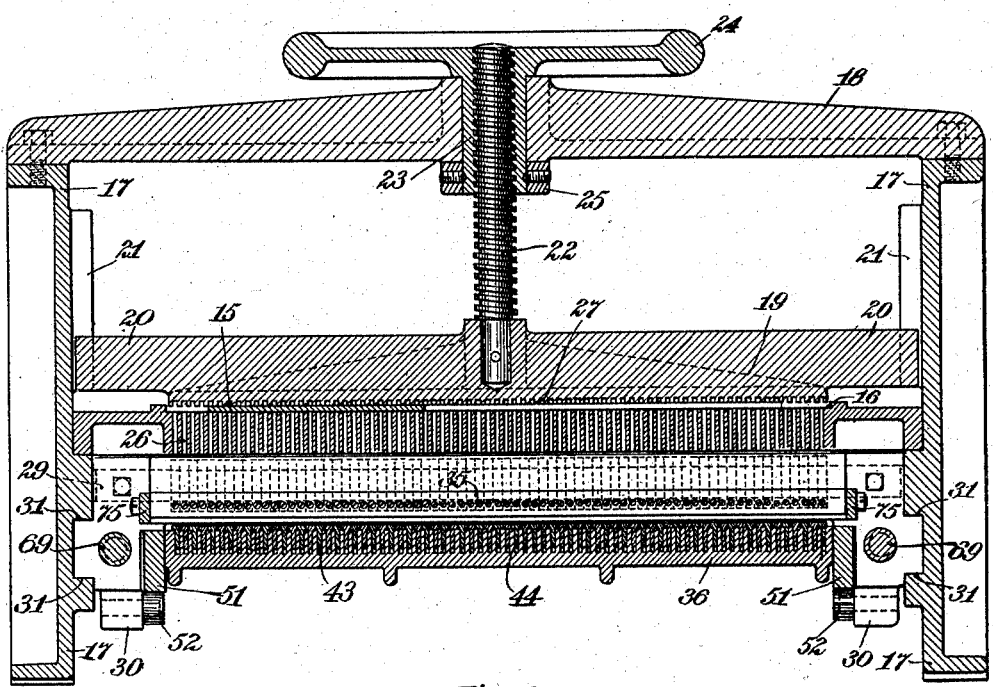
Figure 7:
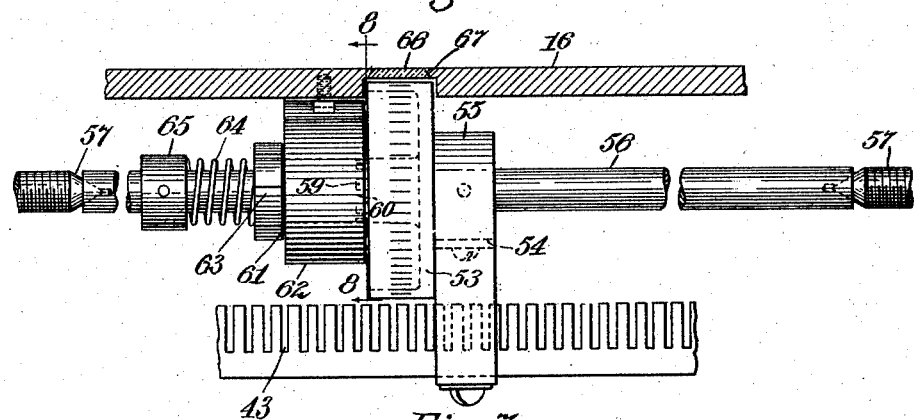
Figure 8:
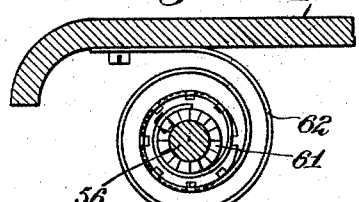
Figure 9:
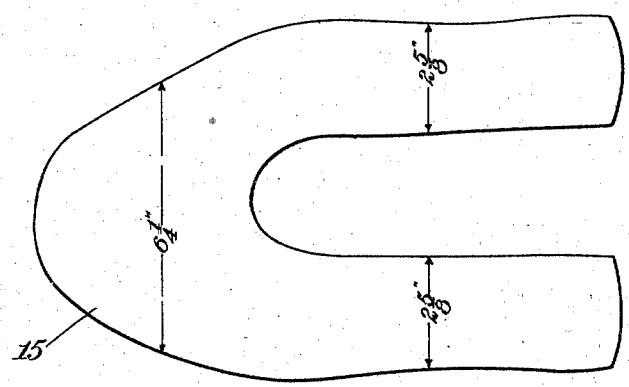
Figure 10:
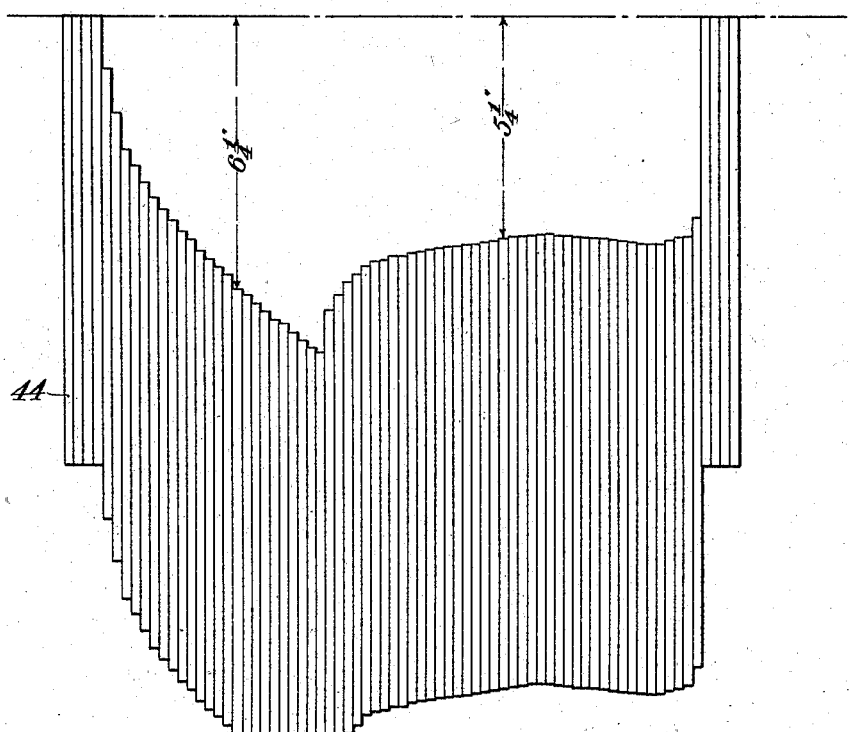

Referring to the drawings: Figure 1 is a plan of a measuring machine embodying my invention. Fig. 2 is a side elevation viewed from the right of Fig. 1. Fig. 3 is a sectional view taken on line 3—3 of Fig. 1 showing the parts in their initial position. Fig. 4 is a sectional view taken on line 4—4 of Fig. 1 showing the position which the parts occupy after the object has been measured. Fig. 5 is a detail sectional view taken in the same plane as Fig. 3 showing a modified form of engaging member carried by the finger which traverses the object to be measured. Fig. 6 is a sectional view taken on line 6—6 of Fig. 2, looking toward the right. Fig. 7 is an enlarged sectional view, partly in elevation, taken on line 7—7 of Fig. 1 and partly broken away to save space. Fig. 8 is a detail sectional view taken on line 8—8 of Fig. 7, looking toward the left. Fig. 9 is a plan of an irregular object such as a shoe pattern which will be used as an example in describing the operation of the machine in measuring the area of one of the plane surfaces of said object. Fig. 10 is a plan diagram showing the relative positions occupied by the weights after the fingers have traversed the object shown in Fig. 9, which position said parts occupy when the area can be read upon the indicator.

Like numerals refer to like parts throughout the several views of the drawings.

In the drawings, 15 is a thin flat object of irregular outline, as shown in Fig. 9, which will be used as an example to illustrate the operation of the machine in measuring one of the plane surfaces of said object, it being understood that the objects to be measured may be of various kinds and thicknesses from a comparatively thin sheet of paper to a thick block. The object 15 to be measured is placed, as shown in Figs. 1, 2, 3, 4 and 6, upon a table or platen 16 suitably supported upon a frame comprising two side members 17 which are extended upwardly beyond the plane of said table and are connected to each other by a yoke or tie 18 rigidly secured thereto. The object 15 is clamped upon the table 16 by a vertically movable clamp plate 19 having projecting arms 20 guided by ways 21 upon the side members 17 of the frame of the machine. A screw 22 terminates at its lower end in the clamp plate 19 and is rigidly secured thereto, said screw having screw-threaded engagement with a nut 23 having formed thereon or secured thereto a hand wheel 24, said nut being journaled in a suitable bearing provided in the yoke 18 and being held against vertical movement therein by means of a collar 25 fast to said nut below said yoke.

It will be readily understood that by rotating the hand wheel 24 in the proper direction the clamp plate 19 will be raised or lowered as may be desired, it being understood that when the object to be meausred is properly positioned upon the table 16, said object is firmly clamped thereon by means of the clamp plate 19. The table 16 is provided with a series of narrow parallel slots 26 extending therethrough from top to bottom, and the clamp plate 19 is provided on its under side with a series of corresponding grooves 27 which register with the slots 26, as shown in Fig. 6.

Located in the slots 26, respectively, are fingers 28 whose lateral shape is clearly shown in Figs. 3 and 4, said fingers being pivoted upon a shaft 29 terminating at its ends in and being secured to a carrier 30 mounted to slide in ways 31 in the side members 17 of the frame of the machine. The fingers 28, where they extend through the slots 26, are of the proper thickness to slide freely in said slots, but below said slots are of greater thickness, being of such thickness that each contacts with the lateral face of the one adjacent thereto. Where the thin portion ends and the thick portion begins there is an abrupt shoulder 32 upon either side of each finger 28. These shoulders bear against the under side of the table 16 and limit the upward movement of the fingers 28 in the slots 26, said fingers in their uppermost position extending upwardly a slight distance beyond the plane of the upper face of the table 16, as shown in Fig. 3. If the object to be measured is comparatively thick, as shown in Fig. 3, the fingers 28 will not extend into the grooves 27, but if said object should be thin like a sheet of paper for example, said fingers will extend into said grooves. These grooves are provided in order that the fingers 28 shall have the requisite travel vertically. The fingers 28 are normally held in this position by means of helical compression springs 33 inserted in holes 34 formed in the carrier 30, each of said springs bearing at one end against one of the fingers 28 and bearing at its other end against a screw 35 by means of which its tension may be varied.

Located below the carrier 30 is a wide lever 36 which may be termed a scale beam, the same being fast to a shaft 37 extending therethrough, said shaft being pivotally supported at its ends upon conical pointed bearing screws 38 having screw-threaded engagement with the side members 17 of the frame of the machine. These screws constitute pivots about which the lever or scale beam 36 is adapted to rock very easily, said screws being capable of being delicately adjusted and when properly adjusted being secured by check nuts 39 having screw-threaded engagement therewith. The lever or scale beam 36 is, in practice, made as light as possible and preferably consists of an aluminum casting provided with arms 40 to which is secured a rod 41 upon which is located a weight or a series of weights 42, the weight of which is such as to normally hold the scale beam 36 and parts carried thereby in equilibrium in the position shown in Fig. 3.

The scale beam 36 is provided in its upper side with a series of grooves 43 in which are located sliding weights 44, respectively, corresponding in number to the fingers 28, said slides being T-shaped in cross section, as shown in Fig. 6, the shouldered portions resting upon the upper face of the scale beam 36. The sliding weights 44 are provided on their upper sides with a series of very fine teeth 45 which at certain times in the operation of the machine, as will be hereinafter described are engaged by pawls 46 connected to the fingers 28, respectively, said pawls being, in this instance, in the form of flat springs extending into and fitting slots 47 in said fingers and secured therein in any suitable manner as by providing the extremity of each spring with an enlarged head 48 located in a corresponding hole 49 in the finger 28.

Adjusting screws 50 having screw-threaded engagement with the fingers 28, respectively, bear against the spring pawls 46 and serve to adjust the same vertically. When the carrier 30 is moved toward the left the fingers 28 will pass beneath the object 15 and will be forced downwardly thereby carrying the pawls 46 into operative engagement with the teeth 45 of the sliding weights 44, it being evident that with an irregular object to be measured some of the fingers will be forced downwardly before others and thus some of the weights 44 will be engaged by their respective pawls 46 before others, in a manner which will be more particularly described hereinafter.

It will be evident that when one of the sliding weights 44 is engaged by its respective pawl 46 during the movement of the carrier 30 toward the left, said weight will be carried along in unison with said carrier and when the finger 28 which controls that particular pawl has traversed the surface of the object by which it is held down, said finger will rise under the influence of the spring 33 and thereby carry its pawl 46 out of engagement with the teeth 45 of the sliding weight 44 with which it is engaged. It will also be understood that if during continued travel of the finger the same engages another part of the surface of the object, said finger will again be carried downwardly and will again cause engagement of its pawl 46 with its corresponding slide 44, thereby carrying said slide along in unison with the carrier a distance equal to the breadth of the surface traversed by the finger. It will be evident that the total travel of each sliding weight 44 will be equal to the breadth of the surface of the object 15 in the plane of the particular finger 28 which controls said weight. During the movement of the carrier 30 toward the left only those sliding weights which are controlled by fingers engaging the object 15 will be moved, since there is nothing to force the remaining fingers of the series downwardly.

By reference to Figs. 9 and 10 the resultant position of the sliding weights after the fingers have traversed the object will be readily understood. For example, if the plane surface of the object 15 in the vertical plane A—A measures $2\frac{5}{8}$ inches and at another part measures $2\frac{5}{8}$ inches, as shown in Fig. 9, the total travel of the sliding weight 44 in said plane will be $5\frac{1}{4}$ inches measured from the starting line 0. In like manner if the breadth of the surface to be measured is $6\frac{1}{4}$ inches in the plane B—B, the travel of the slide 44 in said plane will be $6\frac{1}{4}$ inches, as will be clearly understood by reference to Figs. 9 and 10. In this manner the center of gravity of the sliding weights is moved away from the axis of the scale beam 36 and it will be understood that in all cases the distance which the center of gravity moves is in proportion to the area of the surface being measured.

It will be readily apparent that as the sliding weights 44 move away from the axis of the scale beam 36 there is a tendency for said scale beam to gradually swing downward as the weights travel toward the left, Figs. 2, 3 and 4. If the scale beam were thus allowed to swing downwardly before the fingers have entirely traversed the object to be measured, such swinging of the scale beam would result in the teeth 45 of the sliding weights 44 becoming disengaged from the pawls 46. To prevent this there are provided two cams or tracks 51 secured to opposite sides of the scale beam 36, said tracks being adapted to rest upon rolls 52 journaled upon the carrier 30, the extent of said tracks being such that the scale beam 36 is supported until after the fingers 28 have traversed the object to be measured, that is, said tracks act to prevent the scale beam 36 from rocking during a predetermined travel of the carrier 30 from its initial position. After the fingers 28 have entirely traversed the object, the rolls 52 reach the ends of the tracks 51 and allow the scale beam 36 to swing downwardly into the position shown in Fig. 4.

The scale beam 36 is connected to and operates any suitable type of indicating device which in this instance consists of a drum 53 having a hub 54 to which is secured a flexible connection 55 passing part way therearound, said connection being also secured to the scale beam 36. The drum 53 is fast to a shaft 56 rotatably mounted upon conical pointed screws 57 having screw-threaded engagement with the side members 17 of the frame and having lock nuts 58 thereon whereby the same may be locked against rotation after being properly adjusted. The drum 53 is provided with a series of clutch teeth 59 interengaging with corresponding teeth 60 formed upon a sleeve 61 surrounding the shaft 56 and in this manner said sleeve and drum are normally locked and rotate together as one piece. A spiral spring 62 is coiled about the sleeve 61 and secured at its inner end thereto, the outer end of said spring being secured to the table 16. The tension of this spring may be regulated by withdrawing the teeth 60 out of engagement with the teeth 59 and rotating the sleeve 61 in the proper direction relatively to the drum 53, said sleeve being provided for this purpose with a series of slots 63 in its periphery adapted to receive a suitable spanner, not shown. A helical compression spring 64 bears at one end against a collar 65 fast to the shaft 56 and at its other end against the sleeve 61, thereby normally holding the teeth 60 interlocked with the teeth 59. The drum 53 is, in practice, suitably graduated upon its periphery and the graduations appear through a piece of transparent material 66 inserted in a suitable slot 67 in the table 16, said transparent material having engraved thereon a line 68. The drum 53, as before stated, is suitably graduated and these graduations are properly numbered to read in decimal parts of square feet, the area being read at the line 68.

The carrier 30 is moved back and forth by two parallel screw-threaded shafts 69 having screw-threaded engagement therewith and journaled in suitable bearings provided in the frame of the machine. Secured to the shafts 69, respectively, are miter gears 70 meshing with miter gears 71, respectively, fast to the shaft 72 journaled in suitable bearings in the frame of the machine, the latter shaft having fast thereto a pulley 73 which may be rotated by a belt if desired, or may be rotated by hand, there being provided a handle 74 fast thereto for this purpose. When the shaft 72 is rotated in the proper direction the carrier 30 is caused to travel from its initial position, as shown in Fig. 3, toward the left to the position shown in Fig. 4, and the sliding weights 44 are carried toward the left as hereinbefore described. When the object has thus been measured and its area read upon the drum 53, said object is then removed from the table 16 and the shaft 72 is then rotated in the proper direction to cause the carrier 30 to be returned to its initial position.

Fast to the carrier 30 is a U-shaped yoke 75 having a transverse portion 76 which, when said carrier is moved toward the right, is adapted to engage the left hand ends of the sliding weights 44, it being understood that the left hand ends of the tracks or cams 51 are so formed as to lift the scale beam 36 at the proper time. As the transverse portion 76 of the carrier 75 travels toward the right it will engage and carry along with it all of the sliding weights 44 and will thus return said weights to their initial position, as shown in Fig. 3, after which the machine is ready for another operation.

In Fig. 5 I have shown a modification in which there is substituted for the pawl 46 a resilient member 46′ preferably formed of soft rubber adapted to be pressed into contact with the teeth of the weight so as to carry said weight therewith. This has the advantage that there is no lost motion as in the case of a pawl.

Having thus described my invention, what I claim and desire by Letters Patent to secure is:

1. A machine for measuring areas having, in combination, a scale beam, a plurality of toothed weights supported on said scale beam, a plurality of members to traverse the surface to be measured, and means to support and guide said members longitudinally of said scale beam, said members being adapted to be held by their contact with said surface in driving connection with the teeth of said weights, respectively, thereby to move said weights longitudinally of said scale beam during such contact.

2. A measuring machine having, in combination, a scale beam, a toothed weight supported on said scale beam, a member to traverse the surface to be measured, and means to support and guide said member longitudinally of said scale beam, said member being adapted to be held by its contact with said surface in driving connection with the teeth of said weight thereby to move said weight longitudinally of said scale beam during such contact.

3. A machine for measuring areas having, in combination, a scale beam, a plurality of toothed weights supported on said scale beam, a plurality of members to traverse the surface to be measured, means to support and guide said members longitudinally of said scale beam, said members being adapted to be held by their contact with said surface in driving connection with the teeth of said weights, respectively, thereby to move said weights longitudinally of said scale beam during such contact, and an indicating device to indicate the position of said beam when said members have traversed said surface.

4. A measuring machine having, in combination, a scale beam, a toothed weight supported on said scale beam, a member to traverse the surface to be measured, means to support and guide said member longitudinally of said scale beam, said member being adapted to be held by its contact with said surface in driving connection with the teeth of said weight thereby to move said weight longitudinally of said scale beam during such contact, and an indicating device to indicate the position of said beam when said member has traversed said object.

5. A machine for measuring areas having, in combination a scale beam, a plurality of toothed weights supported on said scale beam, a plurality of members to traverse the surface to be measured, means to support and guide said members longitudinally of said scale beam, and means held by said members in engagement with the teeth of said weights, respectively, when said members contact with said surface, whereby said weights are moved longitudinally of said scale beam during such contact.

6. A machine for measuring areas having, in combination, a scale beam, a toothed weight supported on said scale beam, a member to traverse the surface to be measured, means to support and guide said member longitudinally of said scale beam, and means held by said member in engagement with the teeth of said weight when said member contacts with said surface, whereby said weight is moved longitudinally of said scale beam during such contact.

7. A machine for measuring areas having, in combination, a scale beam, a plurality of toothed weights supported on said scale beam, a plurality of members to traverse the surface to be measured, means to support and guide said members longitudinally of said scale beam, and means to impart a relative movement to said members and the object to be measured, said members being adapted to be held by their contact with the surface of said object in driving connection with the teeth of said weights, respectively, thereby to move said weights longitudinally of said scale beam during such contact.

8. A measuring machine having, in combination, a scale beam, a toothed weight supported on said scale beam, a member to traverse the object to be measured, and means to impart to said member a movement relatively to said object and longitudinally of said scale beam, said member being adapted to be held by its contact with the surface of said object in driving connection with the teeth of said weight, thereby to move said weight longitudinally of said scale beam during such contact.

9. A machine for measuring areas having, in combination, a scale beam, a plurality of toothed weights supported on said scale beam, a plurality of members to traverse the surface to be measured, a carrier on which said members are mounted and means to move said carrier longitudinally of said scale beam whereby said members are carried across said surface, said members being adapted to be held by their contact with said surface in driving connection with the teeth of said weights, respectively, thereby to move said weights longitudinally of said scale beam during said contact.

10. A machine for measuring areas having, in combination, a scale beam, a toothed weight supported on said scale beam, a member to traverse the surface to be measured, a carrier on which said member is mounted, and means to move said carrier longitudinally of said scale beam whereby said member is carried across said surface, said member being adapted to be held by its contact with said surface in driving connection with the teeth of said weight, thereby to move said weight longitudinally of said scale beam during such contact.

11. A machine for measuring areas having, in combination, a table, means to hold the object to be measured in fixed position on said table, a scale beam, a plurality of weights supported on said scale beam, a plurality of members to traverse said object, and means to support and guide said members longitudinally of said scale beam, said members being adapted to be held by their contact with said object in driving connection with said weights, thereby to move said weights longitudinally of said scale beam during said contact.

12. A measuring machine having, in combination, a table, means to hold the object to be measured in fixed position on said table, a scale beam, a weight supported on said scale beam, a member to traverse said object, and means to support and guide said member longitudinally of said scale beam, said member being adapted to be held by its contact with said object in driving connection with said weight, thereby to move said weight longitudinally of said scale beam during such contact.

13. A machine for measuring areas having, in combination, a plurality of members to traverse the object to be measured, a scale beam, a plurality of weights supported on said scale beam and adapted to be moved longitudinally thereof by said members, respectively, while traversing said object, and a member to engage and return said weights to their initial position after the object has been measured.

14. A machine for measuring areas having, in combination, a scale beam, a plurality of weights supported on said scale beam, a support having a surface to support the object to be measured, a plurality of members interposed between said surface and said weights, and a carrier on which said members are yieldingly supported to move transversely of the plane of the surface to be measured whereby by their contact therewith they are held in driving connection with said weights, respectively.

15. A machine for measuring areas having, in combination, a plurality of members to traverse the object to be measured, a carrier by which said members are carried across said object, a scale beam, a plurality of weights supported on said beam and adapted to be moved longitudinally thereof by said members, respectively, while traversing said object, and a member to engage and return said weights to their initial position after the object has been measured.

16. A measuring machine having, in combination, a member to traverse the object to be measured, a carrier by which said member is carried across said object, a scale beam, a weight supported on said beam and adapted to be moved longitudinally thereof by said member while traversing said object, and means carried by said carrier on its return movement to engage and return said weight to its initial position after the object has been measured.

17. A machine for measuring areas having, in combination, a plurality of members to traverse the object to be measured, a carrier by which said members are carried across said object, a scale beam, a plurality of weights supported on said scale beam and adapted to be moved longitudinally thereof by said members, respectively, while traversing said object, and a device acting on said scale beam to prevent the same from tilting until said carrier has moved a predetermned distance from its initial position.

18. A measuring machine having, in combination, a member to traverse the object to be measured, a carrier by which said member is carried across said object, a scale beam, a weight supported on said scale beam and adapted to be moved longitudinally thereof by said member while traversing said object, and a device acting on said scale beam to prevent the same from tilting until said carrier has moved a predetermined distance from its initial position.

19. A machine for measuring areas having, in combination, a scale beam, a plurality of weights supported on said scale beam, a support having a surface to support the object to be measured, and a plurality of yielding members to traverse the object to be measured, said members being interposed between said surface and said weights and being arranged to be held by their contact with said object in driving connection with said weights, respectively.

20. A machine for measuring areas having, in combination, a table to support the object to be measured, said table being provided with a plurality of parallel slots, a plurality of members projecting through said slots adapted to engage said object and traverse the same when moved longitudinally of said slots, a scale beam, and a plurality of weights supported on said scale beam and adapted to be moved longitudinally thereof by said members, respectively, while traversing said object.

21. A machine for measuring areas having, in combination, a table to support the object to be measured, said table being provided with a plurality of parallel slots, a clamping member adapted to clamp said object against said table, said member being provided with a plurality of parallel grooves registering with said slots, respectively, a plurality of members projecting through said slots adapted to engage said object and traverse the same when moved longitudinally of said slots, a scale beam, and a plurality of weights supported on said scale beam and adapted to be moved longitudinally thereof by said members, respectively, while traversing said object.

22. A machine for measuring areas having, in combination, a plurality of members to traverse the object to be measured, a carrier on which said members are pivotally supported so as to be moved transversely of the plane of the surface to be measured, a scale beam, and a plurality of weights supported on said scale beam and adapted to be moved longitudinally thereof by said members, respectively while traversing said object.

23. A machine for measuring areas having, in combination, a plurality of members to traverse the object to be measured, a carrier on which said members are supported so as to be movable transversely of the plane of the surface to be measured, a scale beam, and a plurality of weights supported on said scale beam and provided with a series of teeth, said members having means thereon adapted to engage said teeth when said members contact with said object.

24. A machine for measuring areas having, in combination, a plurality of members to traverse the object to be measured, a carrier on which said members are supported so as to be movable transversely of the plane of the surface to be measured, a scale beam, a plurality of weights supported on said scale beam and provided with a series of teeth, said members having means thereon adapted to engage said teeth when said members contact with said object, and an indicator connected to and operated by said scale beam.

25. A machine for measuring areas having, in combination, a plurality of members to traverse the object to be measured, a carrier on which said members are supported so as to be movable transversely of the plane of the surface to be measured, a scale beam, a plurality of weights supported on said scale beam and provided with a series of teeth, and a plurality of pawls carried by said members, respectively, adapted to engage said teeth when said members contact with said object, whereby said weights are moved longitudinally of said beam.

26. A machine for measuring areas having, in combination, a plurality of members to traverse the object to be measured, a carrier by which said members are carried across said object, means to move said carrier, a scale beam, and a plurality of weights supported on said beam and adapted to be moved longitudinally thereof by said members, respectively, while traversing said object.

27. A machine for measuring areas having, in combination, a plurality of members to traverse the object to be measured, means to limit the movement of said members so that the same shall have a predetermined travel transversely of the plane of the surface to be measured, an indicating device, and mechanical means actuated by said members to operate said indicating device.

28. A machine for measuring areas having, in combination, a plurality of members to traverse the object to be measured, means to limit the movement of said members so that the same shall have a predetermined travel transversely of the plane of the surface to be measured, means to impart a relative movement to said members and said object to cause said members to traverse said object, an indicating device, and mechanical means actuated by said members to operate said indicating device.

29. A machine for measuring areas having, in combination, a plurality of members to traverse the object to be measured, a member to hold said object, said holding member being provided with a series of grooves adapted to receive said members, respectively, said members having a predetermined travel transversely of the plane of the surface to be measured, an indicating device, and means actuated by said members to operate said indicating device.

30. A machine for measuring areas having, in combination, a plurality of members each having a point of contact having a predetermined rectilinear travel transversely of the object to be measured, a scale beam, and a plurality of weights supported on said scale beam and adapted to be moved longitudinally thereof by said members, respectively, while traversing said object.

31. A measuring machine having, in combination, a member having a point of contact having a predetermined rectilinear travel transversely of the object to be measured, a scale beam, and a weight supported on said beam and adapted to be moved longitudinally thereof by said member while traversing said object.

In testimony whereof I have hereunto set my hand in presence of two subscribing witnesses.

JOHN F. TEEHAN.

Witnesses:
 LOUIS A. JONES,
 SADIE V. MCCARTHY.